(12) United States Patent
Shimizu et al.

(10) Patent No.: US 10,907,849 B2
(45) Date of Patent: Feb. 2, 2021

(54) AIR CONDITIONER INCLUDING A PLURALITY OF UTILIZATION UNITS CONNECTED IN PARALLEL TO A HEAT SOURCE UNIT

(71) Applicant: DAIKIN INDUSTRIES, LTD., Osaka (JP)

(72) Inventors: Katsutoshi Shimizu, Osaka (JP); Akiyoshi Yamamoto, Osaka (JP); Kenshi Tsuji, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 71 days.

(21) Appl. No.: 16/476,693

(22) PCT Filed: Jan. 25, 2018

(86) PCT No.: PCT/JP2018/002187
§ 371 (c)(1),
(2) Date: Jul. 9, 2019

(87) PCT Pub. No.: WO2018/155056
PCT Pub. Date: Aug. 30, 2018

(65) Prior Publication Data
US 2020/0378642 A1    Dec. 3, 2020

(30) Foreign Application Priority Data
Feb. 24, 2017  (JP) ................... 2017-033244

(51) Int. Cl.
*G05B 19/042* (2006.01)
*F24F 11/46* (2018.01)
(Continued)

(52) U.S. Cl.
CPC .............. *F24F 11/46* (2018.01); *F24F 11/64* (2018.01); *F24F 11/67* (2018.01); *F24F 11/80* (2018.01);
(Continued)

(58) Field of Classification Search
CPC ......................... F24F 11/80; G05B 2219/2614
See application file for complete search history.

(56) References Cited

U.S. PATENT DOCUMENTS

2006/0161307 A1* 7/2006 Patel .................. H05K 7/20745
700/277
2013/0055751 A1* 3/2013 Inaba ...................... F25B 5/04
62/498

(Continued)

FOREIGN PATENT DOCUMENTS

| JP | H09-178284 A | 7/1997 |
|----|--------------|--------|
| JP | 2008-175507 A | 7/2008 |

(Continued)

OTHER PUBLICATIONS

International Search Report issued in corresponding application No. PCT/JP2018/002187 dated Apr. 24, 2018 (4 pages).

(Continued)

*Primary Examiner* — Nathan L Laughlin
(74) *Attorney, Agent, or Firm* — Osha Bergman Watanabe & Burton LLP

(57) ABSTRACT

An air conditioner includes: a heat source unit including a compressor and a heat source-side heat exchanger; and a plurality of utilization units each including a decompressing device and a utilization-side heat exchanger. The utilization units are connected in parallel to the heat source unit to form a refrigerant circuit. The air conditioner performs a cooling operation using the heat source-side heat exchanger as a condenser and the utilization-side heat exchanger as an
(Continued)

evaporator. The air conditioner further includes: a detection sensor that detects a state of air related to a required capacity of each of the utilization units; and a control apparatus that acquires the required capacity of each of the utilization units based on a detection result of the detection sensor.

4 Claims, 5 Drawing Sheets

(51) Int. Cl.
  *F24F 11/64*  (2018.01)
  *F24F 11/80*  (2018.01)
  *F24F 11/67*  (2018.01)

(52) U.S. Cl.
  CPC .... G05B 19/042 (2013.01); *G05B 2219/2614* (2013.01)

(56) References Cited

U.S. PATENT DOCUMENTS

| | | | |
|---|---|---|---|
| 2015/0168033 A1* | 6/2015 | Yamakawa | F25B 13/00 62/324.6 |
| 2016/0146523 A1* | 5/2016 | Hatakeyama | F25B 49/025 62/324.6 |
| 2016/0238268 A1 | 8/2016 | Nishimura et al. | |
| 2017/0254569 A1* | 9/2017 | Kuroda | F25B 1/10 |
| 2018/0095483 A1 | 4/2018 | Tokudi et al. | |

FOREIGN PATENT DOCUMENTS

| | | |
|---|---|---|
| JP | 2014-126286 A | 7/2014 |
| JP | 2015-068614 A | 4/2015 |
| JP | 2016-196971 A | 11/2016 |
| WO | 2015045777 A1 | 4/2015 |

OTHER PUBLICATIONS

Notification of Reasons for Refusal issued in corresponding Japanese application No. JP2017-033244 dated Apr. 11, 2018 (12 pages).

Notification of Reasons for Refusal issued in corresponding Japanese application No. JP2017-033244 dated Nov. 20, 2018 (9 pages).

English Translation of the International Preliminary Report on Patentability issued in corresponding International Application No. PCT/JP2018/002187, dated Apr. 24, 2018 (9 pages).

* cited by examiner

AIR CONDITIONER INCLUDING A PLURALITY OF UTILIZATION UNITS CONNECTED IN PARALLEL TO A HEAT SOURCE UNIT

TECHNICAL FIELD

The present invention relates to an air conditioner in which a plurality of utilization units is connected in parallel to a heat source unit.

BACKGROUND

In a large continuous space of, for example, a factory, a spot-type air conditioner is used. This air conditioner individually cools or heats a plurality of work areas in order to provide workers in each work area with a comfortable environment. For example, Patent Literature 1 includes a plurality of indoor units installed in respective work areas, a single outdoor unit that circulates refrigerant through the indoor units, and a control panel that controls operations of the indoor units and the outdoor unit, and is configured to blow out temperature-controlled air from each indoor unit to workers.

PATENT LITERATURE

Patent Literature 1: Japanese Unexamined Patent Publication No. 2008-175507

In a case of a cooling operation performed by an air conditioner with a plurality of indoor units connected to one outdoor unit as described above, the following control is usually performed. That is, a compressor is controlled such that evaporation temperatures at heat exchangers (evaporators) of all the indoor units reach a constant target value, flow rates of refrigerant flowing through the evaporators are adjusted in accordance with the required capacities of the respective indoor units, and an expansion valve is controlled such that the degree of superheating at evaporator outlets reaches a target value. In this case, however, since the target value of evaporation temperatures is constant, the compressor may be operated at a higher number of rotations than necessary even if the required capacities of all the indoor units are small, and thus driving energy of the compressor may be consumed wastefully.

Alternatively, it is also possible to operate the compressor at an appropriate number of rotations and achieve energy saving by appropriately changing the target value of evaporation temperatures in accordance with the highest required capacity among the required capacities of the plurality of indoor units. In this case, however, the indoor unit with a small required capacity may perform cooling more than necessary and the comfort may be reduced.

SUMMARY

Embodiments of the present invention provide an air conditioner that can achieve both energy conservation and comfort.

One or more embodiments of the present invention provides an air conditioner including:

a heat source unit including a compressor and a heat source-side heat exchanger; and a plurality of utilization units each including a decompressing device and a utilization-side heat exchanger, the plurality of utilization units being connected in parallel to the heat source unit to form a refrigerant circuit, the air conditioner performing a cooling operation using the heat source-side heat exchanger as a condenser and the utilization-side heat exchanger as an evaporator, the air conditioner further including;

a detection sensor detecting a state of air related to a required capacity of each of the utilization units; and a control apparatus acquiring the required capacity of each of the utilization units based on a detection result of the detection sensor, setting target values of each of an evaporation temperature in the utilization-side heat exchanger adjusted by the compressor and a predetermined refrigerant state adjusted by the decompressing device in accordance with the highest required capacity and, when a cooling temperature becomes lower than a target cooling temperature by a predetermined value or more in one of the utilization units other than the utilization unit having the highest required capacity, changing the target value of the refrigerant state such that a cooling capacity of the other utilization unit is lowered.

The air conditioner according to one or more embodiments sets the target value of the evaporation temperature of the utilization-side heat exchanger in accordance with the highest required capacity among the required capacities of the plurality of utilization units. This makes it possible to operate the compressor at an appropriate number of rotations in accordance with an actual cooling load, and to suppress wasteful energy consumption. In the case where the evaporation temperature is set as described above, one of the utilization units other than the utilization unit having the highest required capacity may perform cooling excessively. However, when the cooling temperature becomes lower than the target cooling temperature by a predetermined value or more, the target value of the predetermined refrigerant state is changed to lower the cooling capacity, whereby the cooling temperature of the other utilization unit can reliably reach the target temperature to ensure comfort. Reducing the cooling capacity thereafter can suppress excessive cooling.

In one or more embodiments, the refrigerant state is a degree of superheating, and when the cooling temperature becomes lower than the target cooling temperature by the predetermined value or more in the other utilization unit, the control apparatus sets the target value of the degree of superheating higher than before the cooling temperature is lowered.

In one or more embodiments, when the cooling temperature becomes lower than the target cooling temperature by the predetermined value or more, the utilization-side heat exchanger can evaporate the refrigerant at an early stage to suitably reduce the cooling capacity.

In one or more embodiments, when the cooling temperature becomes lower than the target cooling temperature by the predetermined value or more in the other utilization unit, the control apparatus controls the decompressing device such that a refrigerant flow path of the decompressing device becomes narrower than before the cooling temperature is lowered.

According to one or more embodiments, when the cooling temperature becomes lower than the target cooling temperature by the predetermined value or more, a flow rate of the refrigerant flowing through the utilization-side heat exchanger can be decreased to suitably reduce the cooling capacity.

In one or more embodiments, each of the utilization units is a spot type that blows temperature-controlled air directly onto a target to be cooled.

In order to give comfort to the target to be cooled, the spot-type utilization unit blows temperature-controlled air directly onto the target to be cooled, rather than adjusting the temperature of a space where the utilization unit is installed. Therefore, making the cooling temperature of the utilization unit reach the target temperature without fail as described above is more effective for giving comfort.

In one or more embodiments, the heat source unit further includes a switching device switching the cooling operation to a heating operation in which the heat source-side heat exchanger is used as an evaporator and the utilization-side heat exchanger is used as a condenser, and during the heating operation, the control apparatus acquires the required capacity of each of the utilization units, sets target values of each of a condensation temperature in the utilization-side heat exchanger adjusted by the compressor and a predetermined refrigerant state adjusted by the decompressing device in accordance with the highest required capacity and, even when a heating temperature rises above a target heating temperature in one of the utilization units other than the utilization unit having the highest required capacity, maintains the target value of the refrigerant state.

According to one or more embodiments, also during the heating operation, the target value of the condensation temperature of the utilization-side heat exchanger is set in accordance with the highest required capacity among the required capacities of the plurality of utilization units. This makes it possible to operate the compressor at an appropriate number of rotations in accordance with an actual heating load, and to suppress wasteful energy consumption. In the case where the condensation temperature is set as described above, one of the utilization units other than the utilization unit having the highest required capacity may perform heating excessively. However, if control is performed, similarly to the above-described cooling operation, to lower the heating capacity by changing the target value of the predetermined refrigerant state when the heating temperature becomes higher than the target heating temperature by a predetermined value or more, the refrigerant may be accumulated in the utilization-side heat exchanger, and the amount of refrigerant circulating through the entire refrigerant circuit of the air conditioner may be reduced, which may lead to an unstable heating operation. During the heating operation, therefore, the target value of the predetermined refrigerant state is maintained even if the heating becomes excessive, in order not to lower the heating capacity. This can ensure the reliability of the heating operation of the air conditioner.

An air conditioner according to one or more embodiments of the present invention includes:

a heat source unit including a compressor and a heat source-side heat exchanger;

a plurality of utilization units each including a decompressing device and a utilization-side heat exchanger; and a detection sensor detecting a suction temperature or a blow-out temperature of air of each of the utilization units, the plurality of utilization units being connected in parallel to the heat source unit to form a refrigerant circuit, the air conditioner performing a cooling operation using the heat source-side heat exchanger as a condenser and the utilization-side heat exchanger as an evaporator, wherein the utilization units have different differential temperatures between a detection result of the detection sensor and a set temperature of each of the utilization units, and the air conditioner further includes a control apparatus configured to, when the suction temperature or the blow-out temperature in one of the utilization units other than the utilization unit having the largest differential temperature becomes lower than the set temperature of the other utilization unit by a predetermined value or more, decrease an opening degree of the decompressing device in the other utilization unit such that the suction temperature or the blow-out temperature becomes higher than before the suction temperature or the blow-out temperature is lowered.

In the air conditioner according to one or more embodiments, when the suction temperature or the blow-out temperature becomes lower than the set temperature by a predetermined value or more in one of the utilization units other than the utilization unit having the largest differential temperature between the set temperature and the suction temperature or the blow-out temperature of each of the utilization units, the opening degree of the decompressing device is decreased in order to raise the suction temperature or the blow-out temperature. As a result, the suction temperature or the blow-out temperature of the other utilization unit can reach the set temperature without fail to ensure comfort, after which the suction temperature or the blow-out temperature can be raised to suppress excessive cooling.

According to one or more embodiments of the present invention, it is possible to achieve both energy conservation and comfort.

DETAILED DESCRIPTION

Embodiments of the present invention will be described below with reference to the drawings.

<Overall Configuration of Air Conditioner>

Figure 1:
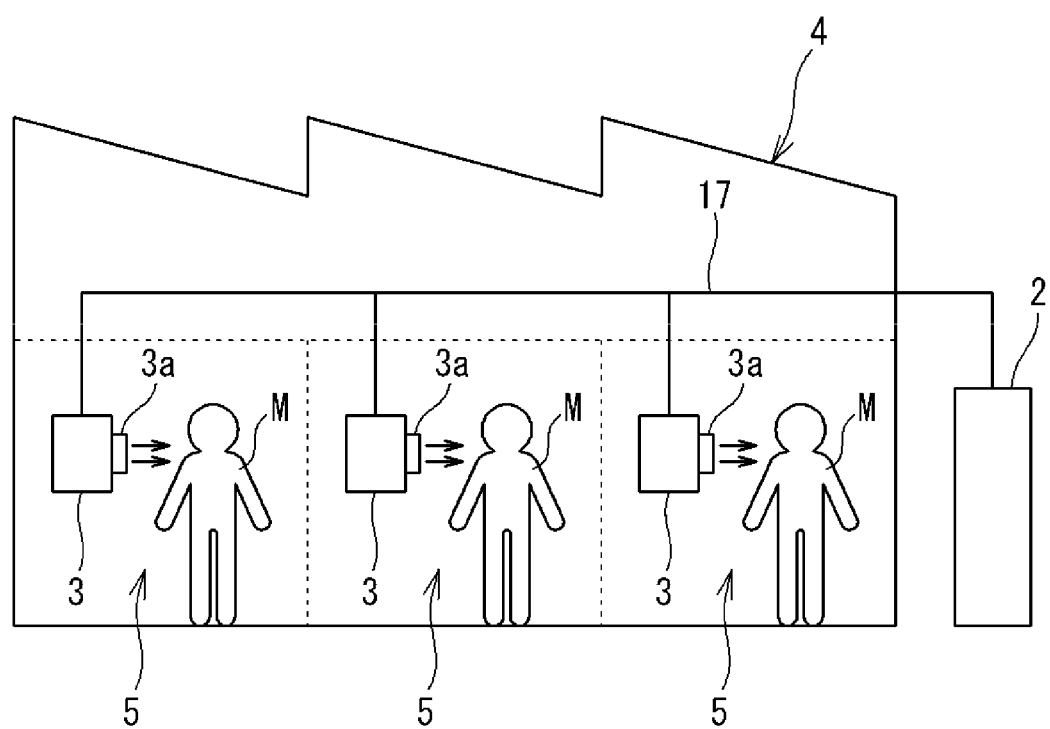
FIG. 1 is a schematic configuration diagram of an air conditioner according to one or more embodiments of the present invention.

FIG. 1 is a schematic configuration diagram of an air conditioner according to one or more embodiments of the present invention.

An air conditioner 1 according to one or more embodiments is a spot-type air conditioner configured to individually blow out temperature-controlled air to a plurality of work areas 5 set in a large continuous space of, for example, a factory 4.

The air conditioner 1 includes one or more outdoor units (heat source units) 2 and a plurality of indoor units (utilization units) 3. The outdoor unit 2 and the indoor units 3 are connected by a connection pipe 17. The outdoor unit 2 is installed outside the factory 4, and the indoor units 3 are each installed in the corresponding one of the plurality of work areas 5 in the factory 4. Each of the indoor units 3 includes a blow-out port 3a for blowing out air in a concentrated manner. The indoor units 3 are each configured to directly blow out air, through the blow-out port 3a, onto a worker M working in the work area 5 to provide the worker M with a comfortable working environment.

Figure 2:
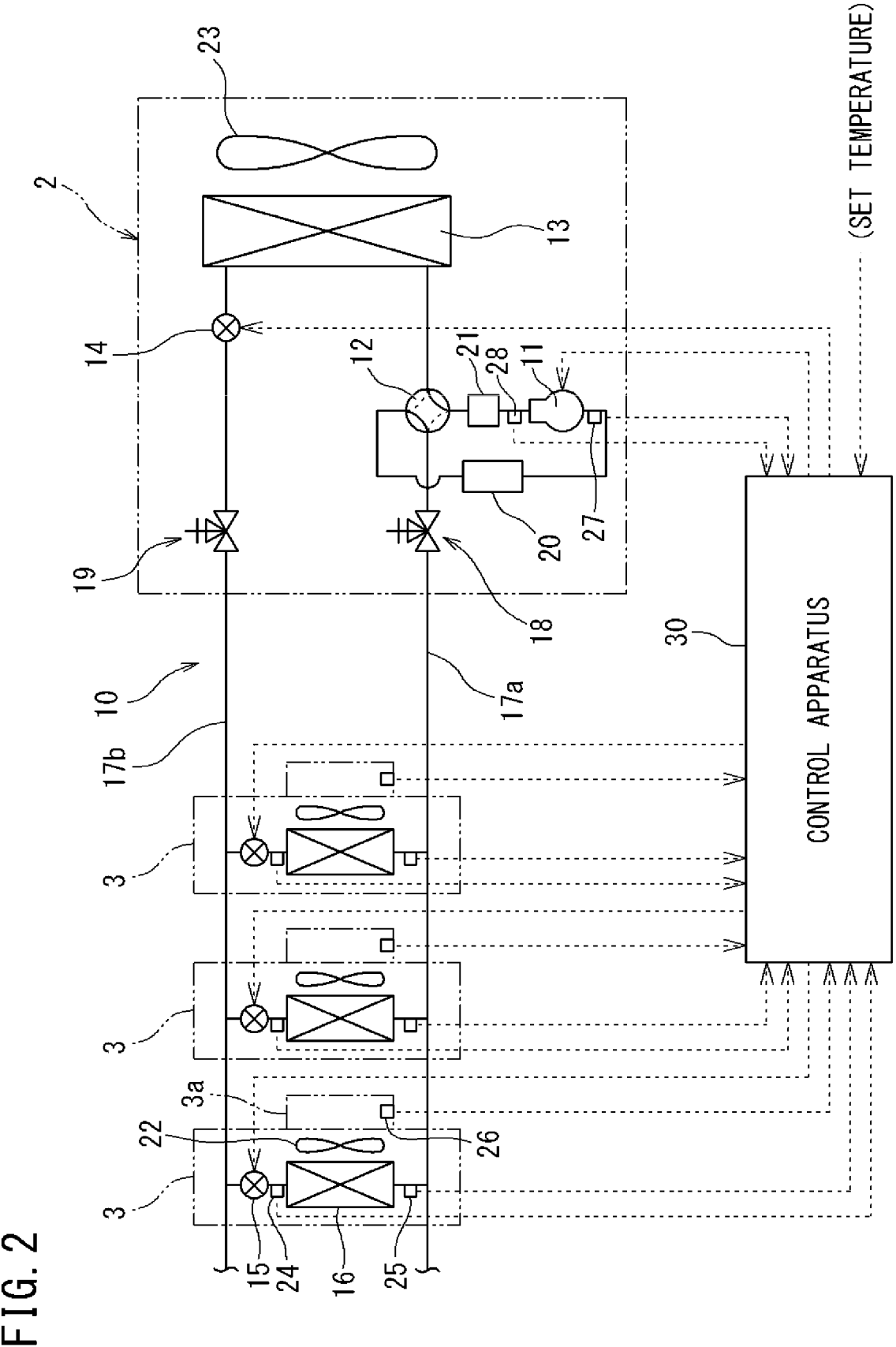
FIG. 2 is a schematic diagram of a refrigerant circuit of the air conditioner according to one or more embodiments.

FIG. 2 is a schematic diagram of a refrigerant circuit of the air conditioner 1 according to one or more embodiments. In the air conditioner 1 of one or more embodiments, the plurality of indoor units 3 is connected in parallel to one outdoor unit 2 to form a refrigerant circuit 10 through which refrigerant flows. The air conditioner 1 also includes a control apparatus 30 that controls the entire operation.

(Configuration of Indoor Unit 3)

Each of the indoor units 3 includes an indoor expansion valve (decompressing device) 15, an indoor heat exchanger 16 and the like, which are connected by a refrigerant pipe. The indoor unit 3 further includes a fan 22 and the like.

The indoor expansion valve 15 is for decompressing the refrigerant flowing through the refrigerant circuit 10 to adjust a flow rate of the refrigerant. The indoor heat exchanger 16 is, for example, a cross-fin type fin-and-tube heat exchanger. The fan 22 is disposed near the indoor heat exchanger 16, and is configured to generate an air flow passing through the indoor heat exchanger 16 to thereby exchange heat between the air and the refrigerant flowing through the indoor heat exchanger 16, and to blow out temperature-controlled air from the blow-out port 3a.

The indoor unit 3 also includes various sensors. A liquid-side temperature sensor 24 is provided on a liquid side of the indoor heat exchanger 16. The liquid-side temperature sensor 24 detects a temperature of refrigerant in a liquid state or a gas-liquid two-phase state. A gas-side temperature sensor 25 is provided on a gas side of the indoor heat exchanger 16. The gas-side temperature sensor 25 detects a temperature of refrigerant in a gas state. A blow-out temperature sensor (cooling or heating temperature sensor) 26 is provided near the blow-out port 3a of the indoor unit 3. The blow-out temperature sensor 26 detects a temperature of air blown out from the blow-out port 3a.

(Configuration of Outdoor Unit 2)

The outdoor unit 2 includes a compressor 11, a four-way switching valve (switching device) 12, an outdoor heat exchanger 13, an outdoor expansion valve 14, an accumulator 20, an oil separator 21 and the like, which are connected by refrigerant pipes. The outdoor unit 2 also includes a fan 23. The four-way switching valve 12 and the indoor heat exchanger 16 are connected by a gas-side connection pipe 17a. The outdoor expansion valve 14 and the indoor expansion valve 15 are connected by a liquid-side connection pipe 17b.

The compressor 11 is a hermetic compressor in which a compression element (not illustrated) and a motor (not illustrated) for driving the compression element are housed in a casing. Electric power is supplied to the motor via an inverter device (not illustrated). The motor is configured to change an operating capacity of the compressor 11 by changing an output frequency of the inverter device, that is, the number of rotations of the motor.

The four-way switching valve 12 is for switching a flowing direction of the refrigerant, and connects a discharge side of the compressor 11 and a gas side of the outdoor heat exchanger 13 and connects a suction side of the compressor 11 and the gas-side connection pipe 17a during a cooling operation as one of the air conditioning operations. During a heating operation, the four-way switching valve 12 connects the discharge side of the compressor 11 and the gas-side connection pipe 17a and connects the suction side of the compressor 11 and the gas side of the outdoor heat exchanger 13.

The outdoor heat exchanger 13 is, for example, a cross-fin type fin-and-tube heat exchanger. The outdoor expansion valve 14 is for decompressing the refrigerant flowing through the refrigerant circuit 10. The fan 23 is disposed near the outdoor heat exchanger 13, and generates an air flow passing through the outdoor heat exchanger 13 to thereby exchange heat between the air and the refrigerant flowing through the indoor heat exchanger 16.

The accumulator 20 is a closed vessel connected between the four-way switching valve 12 and the suction side of the compressor 11. The accumulator 20 separates the liquid phase from the gas phase contained in the refrigerant, and only supplies the gas phase to the compressor 11. The oil separator 21 is used to separate refrigeration oil contained in the refrigerant discharged from the compressor 11 and return the refrigeration oil to the compressor 11.

A gas-side shutoff valve 18 and a liquid-side shutoff valve 19 are provided at terminal portions of an internal refrigerant circuit of the outdoor unit 2. The gas-side shutoff valve 18 is disposed on the side of the four-way switching valve 12, and the liquid-side shutoff valve 19 is disposed on the side of the outdoor expansion valve 14. The gas-side connection pipe 17a is connected to the gas-side shutoff valve 18, and the liquid-side connection pipe 17b is connected to the liquid-side shutoff valve 19.

The outdoor unit 2 also includes various sensors. For example, a suction pressure sensor 27 is provided on the suction side of the compressor 11. A discharge pressure sensor 28 is provided on the discharge side of the compressor 11.

(Configuration of Control Apparatus 30)

The control apparatus 30 includes, for example, an indoor control unit (not illustrated) provided in each indoor unit 3, and an outdoor control unit (not illustrated) provided in the outdoor unit 2. The control apparatus 30 includes a microcomputer, a memory, a communication interface and the like. Signals from the various sensors provided in the indoor units 3 and the outdoor unit 2 are input to the control apparatus 30. The control apparatus 30 controls the operations of, for example, the compressor 11, the valves 12, 14, and 15, and the fans 22 and 23. The control apparatus 30 can receive, through a remote controller or the like connected to each indoor unit 3, an input of a target value (set temperature) of a blow-out temperature (cooling temperature or heating temperature) at the indoor unit 3.

Figure 3:
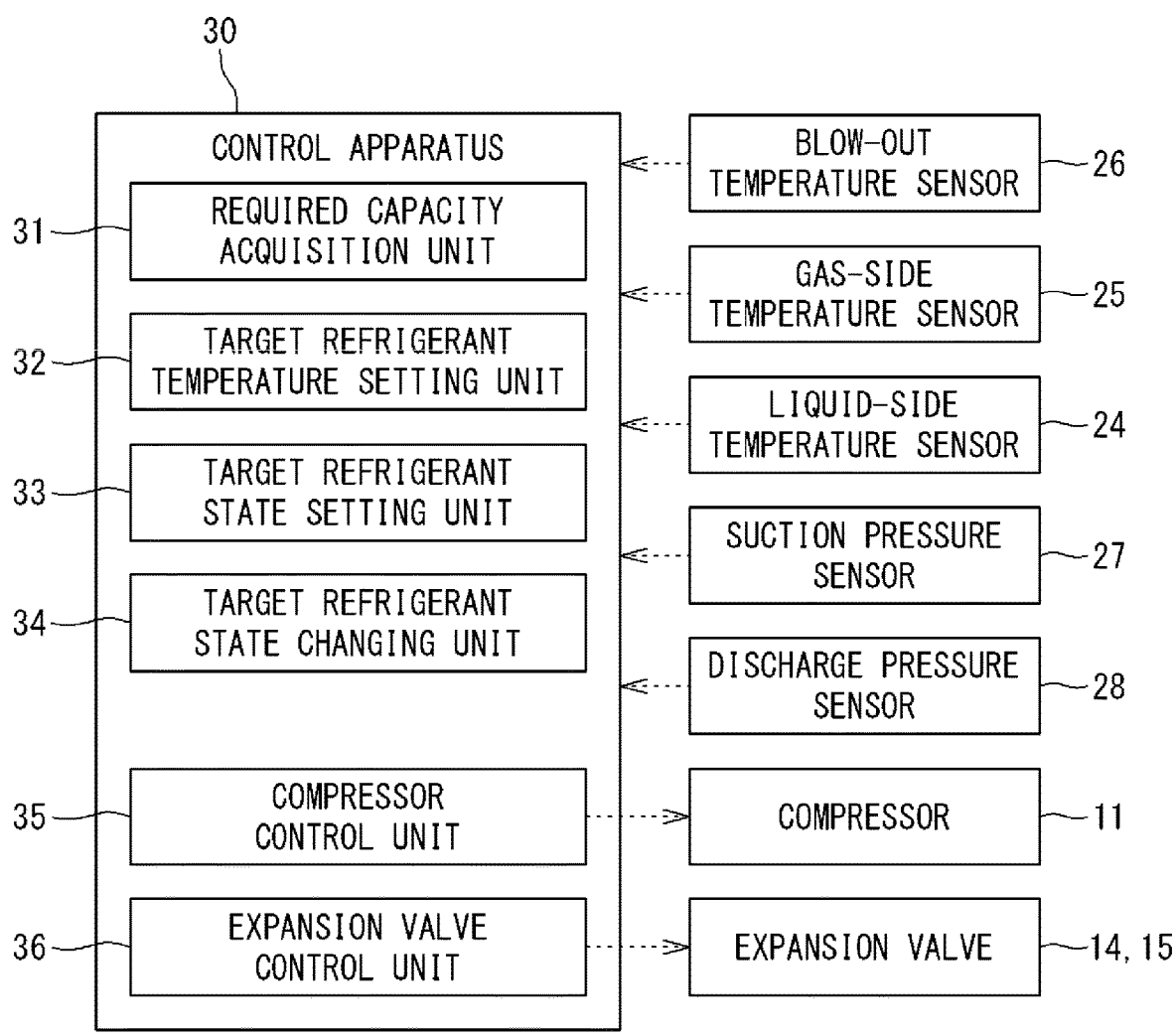
FIG. 3 is a configuration diagram of functions of a control apparatus of the air conditioner according to one or more embodiments.

FIG. 3 is a configuration diagram of functions of the control apparatus 30 of the air conditioner 1 according to one or more embodiments.

The control apparatus 30 functionally includes a required capacity acquisition unit 31, a target refrigerant temperature setting unit 32, a target refrigerant state setting unit 33, a target refrigerant state changing unit 34, a compressor control unit 35, and an expansion valve control unit 36.

The required capacity acquisition unit 31 is a functional unit that acquires the required capacity of each indoor unit 3. The target refrigerant temperature setting unit 32 is a functional unit that sets a target value of an evaporation temperature or a condensation temperature in the indoor heat exchanger 16 and the outdoor heat exchanger 13. The target refrigerant state setting unit 33 is a functional unit that sets a predetermined refrigerant state, which is, in one or more embodiments, a target value of the degree of superheating or subcooling of the refrigerant. The target refrigerant state changing unit 34 is a functional unit that changes the target value of the degree of superheating or subcooling of the refrigerant based on a predetermined condition. The predetermined condition will be described together with actual operation control of the air conditioner.

The compressor control unit 35 is a functional unit that controls the operation of the compressor 11. The compressor control unit 35 according to one or more embodiments is configured to control the operation of the compressor 11 based on the target value of the evaporation temperature or the condensation temperature set by the target refrigerant temperature setting unit 32.

The expansion valve control unit 36 is a functional unit that controls the operations of the indoor expansion valve 15 and the outdoor expansion valve 14. Particularly in one or more embodiments, the expansion valve control unit 36 is configured to control the opening degree of the indoor expansion valve 15 based on the refrigerant state (the degree of superheating or subcooling in the indoor heat exchanger 16) set by the target refrigerant state setting unit 33 and the target refrigerant state changing unit 34.

(Cooling Operation)

During the cooling operation by the air conditioner 1 configured as described above, the four-way switching valve 12 is held in a state illustrated by the solid line in FIG. 2. High-temperature, high-pressure gaseous refrigerant discharged from the compressor 11 flows through the oil separator 21 and the four-way switching valve 12 into the outdoor heat exchanger 13 serving as a condenser, exchanges heat with outdoor air through the operation of the fan 23, and is condensed and liquefied. The liquefied refrigerant passes through the fully opened outdoor expansion valve 14, and flows into each indoor unit 3 through the liquid-side connection pipe 17b. In the indoor unit 3, the refrigerant is decompressed to a predetermined low pressure by the indoor expansion valve 15, further exchanges heat with air in the work area 5 (see FIG. 1) by the indoor heat exchanger 16 serving as an evaporator, and evaporates. The air cooled by the evaporation of the refrigerant is blown out into the work area 5 by the fan 22 and blown onto the worker M. The refrigerant evaporated and vaporized in the indoor heat exchanger 16 returns to the outdoor unit 2 through the gas-side connection pipe 17a, and is sucked into the compressor 11 through the four-way switching valve 12 and the accumulator 20.

(Heating Operation)

During the heating operation, on the other hand, the four-way switching valve 12 is held in a state illustrated by the broken line in FIG. 2. The high-temperature, high-pressure gaseous refrigerant discharged from the compressor 11 flows through the oil separator 21 and the four-way switching valve 12 into the indoor heat exchanger 16 serving as a condenser of each indoor unit 3, exchanges heat with the air in the work area 5, and is condensed and liquefied. The air heated by the condensation of the refrigerant is blown out into the work area 5 by the fan 22 and blown onto the worker M. The refrigerant liquefied in the indoor heat exchanger 16 returns to the outdoor unit 2 from the fully opened indoor expansion valve 15 through the liquid-side connection pipe 17b. The refrigerant that has returned to the outdoor unit 2 is decompressed to a predetermined low pressure by the outdoor expansion valve 14, further exchanges heat with outdoor air by the outdoor heat exchanger 13, and evaporates. The refrigerant evaporated and vaporized in the outdoor heat exchanger 13 is sucked into the compressor 11 through the four-way switching valve 12 and the accumulator 20.

<Control of Cooling Operation>

Basic control of the air conditioner 1 during the cooling operation will be described. During the cooling operation, the air conditioner 1 according to one or more embodiments is controlled such that a blow-out temperature (cooling temperature) Tf of air blown out from each indoor unit 3 becomes a target value (set temperature) Tfm. The target value Tfm is input to the control apparatus 30 via, for example, a remote controller of each indoor unit 3.

Figure 4:
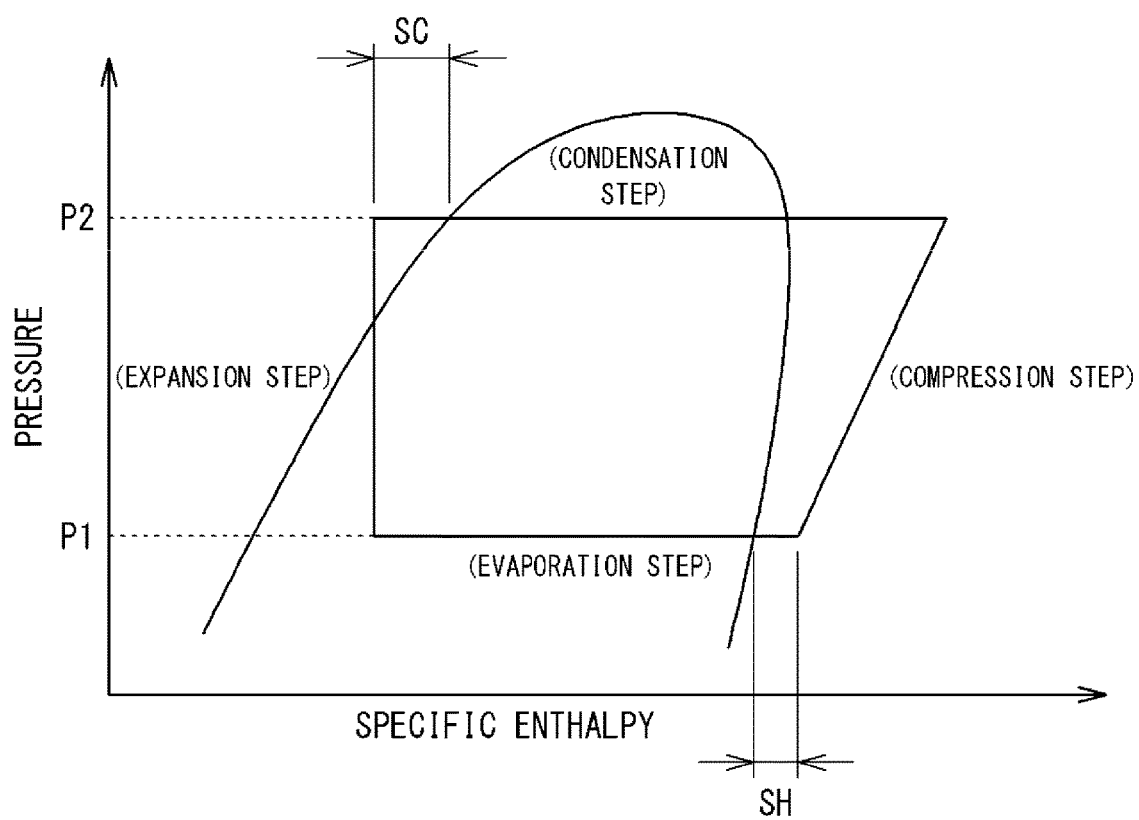
FIG. 4 is a diagram illustrating a refrigeration cycle on a Mollier diagram according to one or more embodiments.

The number of rotations of the compressor 11 in the outdoor unit 2 is controlled by the compressor control unit 35 of the control apparatus 30 such that an evaporation temperature Te of the indoor heat exchanger 16 serving as an evaporator becomes a preset target value Tem. The evaporation temperature Te is a temperature at which the refrigerant evaporates at an evaporation pressure P1 of FIG. 4, and is a temperature of the refrigerant detected by the liquid-side temperature sensor 24. In a case where the evaporation temperature Te detected by the liquid-side temperature sensor 24 is higher than the target evaporation temperature Tem (Te>Tem), the compressor 11 is controlled such that the number of rotations thereof increases. In a case where the evaporation temperature Te is lower than the target evaporation temperature Tem (Te<Tem), on the other hand, the compressor 11 is controlled such that the number of rotations thereof decreases. The target evaporation temperature Tem is the same for all the indoor units 3.

The opening degree of the indoor expansion valve 15 in the indoor unit 3 is controlled by the expansion valve control unit 36 of the control apparatus 30 such that a degree of superheating SH (see FIG. 4) of the refrigerant at the outlet of the indoor heat exchanger 16 becomes a preset target value SHm. For example, in a case where the degree of superheating SH of the refrigerant is larger than the target value SHm (SH>SHm), the indoor expansion valve 15 is controlled such that the opening degree thereof is increased to expand a refrigerant flow path and the flow rate of the refrigerant flowing through the indoor heat exchanger 16 is increased. In a case where the degree of superheating SH of the refrigerant is smaller than the target value SHm (SH<SHm), on the other hand, the indoor expansion valve 15 is controlled such that the opening degree thereof is decreased to narrow the refrigerant flow path and the flow rate of the refrigerant flowing through the indoor heat exchanger 16 is decreased. The degree of superheating SH of the refrigerant can be obtained based on a difference between a refrigerant temperature at the outlet of the indoor heat exchanger 16 detected by the gas-side temperature sensor 25 and a refrigerant temperature at the inlet of the indoor heat exchanger 16 detected by the liquid-side temperature sensor 24 (evaporation temperature Te).

The above control of the compressor 11 and the indoor expansion valve 15 allows the blow-out temperature Tf of each indoor unit 3 to become the target value (set temperature) Tfm.

The method of obtaining the degree of superheating SH of the refrigerant at the outlet of the indoor heat exchanger 16 is not limited to the method described above. Alternatively, the degree of superheating SH may be obtained in such a manner that the suction pressure of the compressor 11 detected by the suction pressure sensor 27 is converted into a saturation temperature value corresponding to the evaporation temperature Te, and the saturation temperature value is subtracted from the value detected by the gas-side temperature sensor 25.

(Setting of Target Evaporation Temperature Tem and Target Degree of Superheating SHm)

Figure 5:
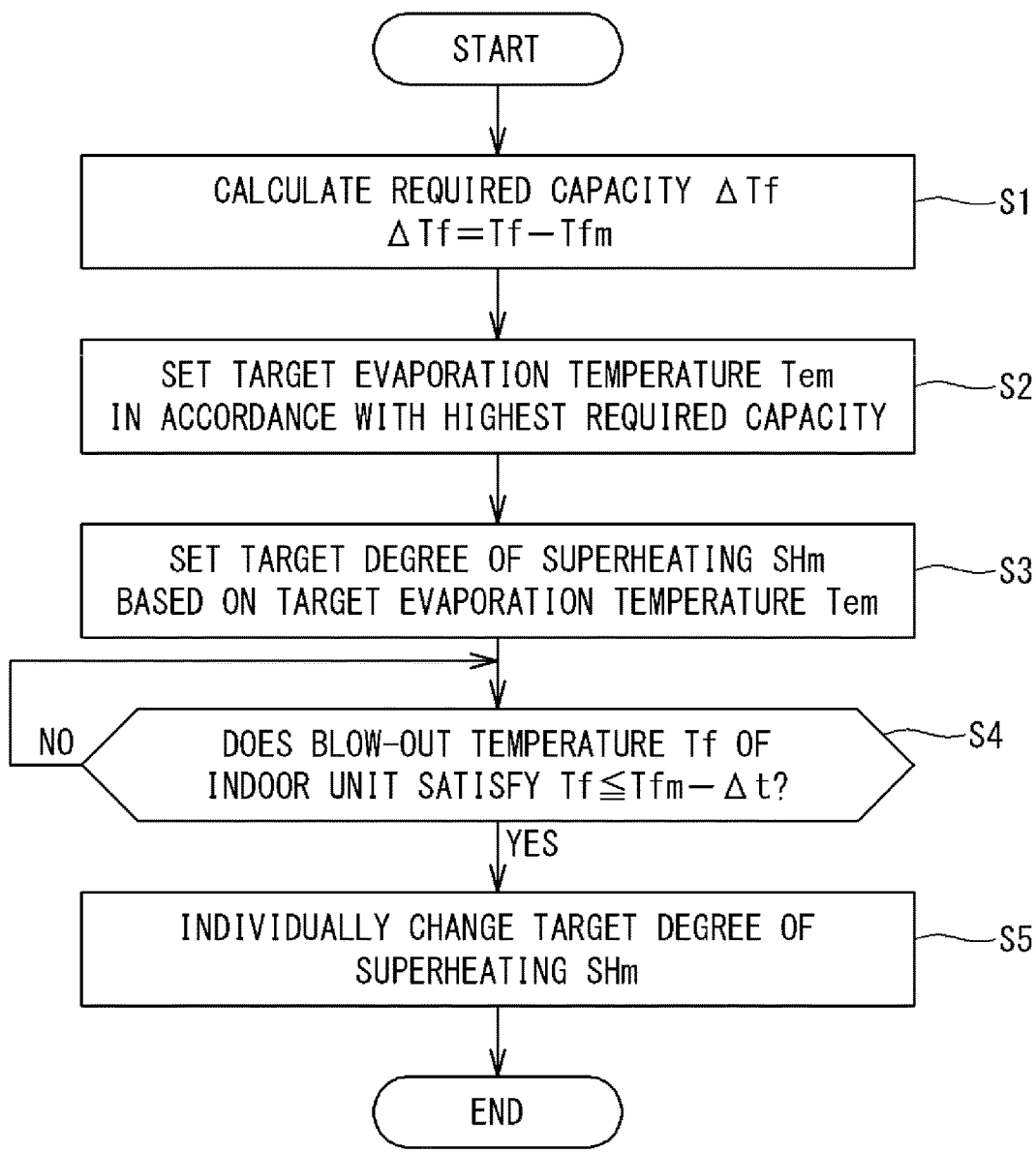
FIG. 5 is a flowchart of a procedure for setting a target evaporation temperature and a target degree of superheating according to one or more embodiments.

FIG. 5 is a flowchart of a procedure for setting the target evaporation temperature Tem and the target degree of superheating SHm according to one or more embodiments.

The target evaporation temperature Tem of the refrigerant in the indoor heat exchanger 16 is set by the target refrigerant temperature setting unit 32 of the control apparatus 30 in accordance with the required capacity of the indoor unit 3. Specifically, the target evaporation temperature Tem is set based on the largest required capacity among the required capacities of the plurality of indoor units 3.

In step S1 of FIG. 5, the required capacity of each indoor unit 3 is calculated by the required capacity acquisition unit 31 of the control apparatus 30 based on a differential temperature ΔTf that is obtained by subtracting the target blow-out temperature Tfm preset by the indoor unit 3 from the actual blow-out temperature Tf detected by the blow-out temperature sensor 26 as in the following formula (1). Therefore, the larger the differential temperature ΔTf, the larger the required capacity.

$$\Delta Tf = Tf - Tfm \quad (1)$$

In step S2 of FIG. 5, the target evaporation temperature Tem is set by the target refrigerant temperature setting unit 32 of the control apparatus 30 to, for example, a temperature that is several to ten-odd degrees lower than the target blow-out temperature Tfm of the indoor unit 3 having the largest required capacity. The required capacity of each indoor unit 3 is constantly acquired during the operation, and the target evaporation temperature Tem is changed in accordance with the change of the required capacity. Determining the required capacity based on the differential temperature ΔTf between the blow-out temperature Tf and the target blow-out temperature Tfm is an example. Alternatively, for example, the suction temperature of the indoor unit 3, or the evaporation temperature or the condensation temperature of the refrigerant at the time of flowing through the indoor unit 3 may be used instead of the blow-out temperature Tf.

The target degree of superheating SHm at the outlet of the indoor heat exchanger 16 in the indoor unit 3 is predetermined to be suitable for the target evaporation temperature Tem. These values SHm and Tem are stored, in association with each other, in a storage unit of the control apparatus 30. Therefore, after the control apparatus 30 sets the target evaporation temperature Tem in accordance with the largest required capacity, the control apparatus 30 causes the target refrigerant state setting unit 33 to read, from the storage unit, and set the target degree of superheating SHm suitable for the target evaporation temperature Tem in step S3 of FIG. 5. Then, in each indoor unit 3, the opening degree of the indoor expansion valve 15 is controlled such that the degree of superheating SH at the outlet of the indoor heat exchanger 16 becomes the target degree of superheating SHm.

The target degree of superheating SHm can be appropriately changed from a value set in accordance with the target evaporation temperature Tem to an optimum value in accordance with the change of the operating condition. In order to improve the operation efficiency, for example, the target degree of superheating SHm may be changed in accordance with a change of an average value of the target blow-out temperatures Tfm in the plurality of indoor units 3, a change of an average value of the blow-out temperatures Tf in the plurality of indoor units 3, or a change of a refrigerant pressure (low pressure value) in the indoor heat exchanger 16 or a refrigerant pressure (high pressure value) in the outdoor heat exchanger 13.

In the case where the target evaporation temperature Tem and the target degree of superheating SHm are set in accordance with the largest required capacity as described above, these values are applied to all the indoor units 3. Therefore, the indoor unit 3 with a small required capacity may cool air more than necessary, and the worker M in the work area 5 may feel uncomfortable by air blown out at a temperature much lower than the target blow-out temperature Tfm. Therefore, the control apparatus 30 of one or more embodiments is configured to perform control for individually changing the target degree of superheating SHm in each indoor unit 3 when the blow-out temperature Tf of the corresponding indoor unit 3 satisfies a predetermined relationship with the target blow-out temperature Tfm in step S4 of FIG. 5.

Specifically, as indicated by the following formula (2), control is performed such that the target degree of superheating SHm is changed to reduce the cooling capacity when the blow-out temperature Tf of the indoor unit 3 becomes lower than the target blow-out temperature Tfm by a predetermined value Δt or more.

$$Tf \leq Tfm - \Delta t \quad (2)$$

For example, control is performed such that the target degree of superheating SHm increases when the blow-out temperature Tf becomes lower than the target blow-out temperature Tfm by (Δt=) 2° C. or more. When the target degree of superheating SHm increases, the indoor expansion valve 15 is controlled such that the opening degree thereof decreases to decrease the flow rate of the refrigerant, and the cooling capacity in the indoor heat exchanger 16 is lowered. As a result, the blow-out temperature Tf rises gradually, and air can be blown onto the worker M at an appropriate temperature.

As in the above formula (2), the target degree of superheating SHm is changed after the blow-out temperature Tf has become lower than the target blow-out temperature Tfm by the predetermined value Δt or more, for the following reason. That is, this is for the purpose of giving desired comfort to the worker M by making the blow-out temperature Tf reach the target blow-out temperature Tfm without fail and blowing the air onto the worker M. Reducing the cooling capacity when the formula (2) is satisfied makes it possible to suppress excessive cooling.

<Control of Heating Operation>

During the heating operation, the basic operation control is substantially the same as that for the cooling operation. In other words, the air conditioner 1 is controlled such that a blow-out temperature (heating temperature) Tf of air blown out from each indoor unit 3 becomes a target value (set temperature) Tfm. The target value Tfm is input to the control apparatus 30 via, for example, the remote controller of each indoor unit 3.

The number of rotations of the compressor 11 in the outdoor unit 2 is controlled by the compressor control unit 35 of the control apparatus 30 such that a condensation temperature Tc of the indoor heat exchanger 16 serving as a condenser in each indoor unit 3 becomes a preset target value Tcm. The condensation temperature Tc is a temperature at which the refrigerant condenses at a condensation pressure P2 of FIG. 4. In a case where the condensation temperature Tc is lower than the target condensation temperature Tcm (Tc<Tcm), the compressor 11 is controlled such that the number of rotations thereof increases. In a case where the condensation temperature Tc is higher than the target condensation temperature Tcm (Tc>Tcm), on the other hand, the compressor 11 is controlled such that the number of rotations thereof decreases. The target condensation temperature Tcm is the same for all the indoor units 3.

The opening degree of the indoor expansion valve 15 in the indoor unit 3 is controlled by the expansion valve control unit 36 of the control apparatus 30 such that a degree of subcooling SC (see FIG. 4) of the refrigerant at the outlet of the indoor heat exchanger 16 becomes a preset target value SCm. For example, in a case where the degree of subcooling SC of the refrigerant is larger than the target value SCm (SC>SCm), the indoor expansion valve 15 is controlled such that the opening degree thereof is increased to increase the flow rate of the refrigerant flowing through the indoor heat exchanger 16. In a case where the degree of subcooling SC of the refrigerant is smaller than the target value SCm (SC<SCm), on the other hand, the indoor expansion valve 15 is controlled such that the opening degree thereof is decreased to decrease the flow rate of the refrigerant flowing through the indoor heat exchanger 16. The degree of subcooling SC of the refrigerant can be calculated in such a manner that the discharge pressure of the compressor 11 detected by the discharge pressure sensor 28 is converted into a saturation temperature value corresponding to the condensation temperature Tc, and the refrigerant temperature detected by the liquid-side temperature sensor 24 is subtracted from the saturation temperature value of the refrigerant.

The above control of the compressor 11 and the indoor expansion valve 15 allows the blow-out temperature Tf of each indoor unit 3 to become the target value Tfm.

(Setting of Condensation Temperature)

The target condensation temperature Tcm of the refrigerant in the indoor heat exchanger 16 is set by the target refrigerant temperature acquisition unit of the control apparatus 30 in accordance with the required capacity of the indoor unit 3. Specifically, the target condensation temperature Tcm is set based on the largest required capacity among the required capacities of the plurality of indoor units 3.

The required capacity of each indoor unit 3 is calculated by the required capacity acquisition unit of the control apparatus 30 based on a differential temperature ΔTf that is obtained by subtracting the target blow-out temperature Tfm preset by the indoor unit 3 from the actual blow-out temperature Tf detected by the blow-out temperature sensor 26 of the indoor unit 3. Therefore, the larger the differential temperature ΔTf, the larger the required capacity.

The target condensation temperature Tcm is set to, for example, a temperature that is several to ten-odd degrees higher than the target blow-out temperature Tfm of the indoor unit 3 having the largest required capacity. The required capacity of each indoor unit 3 is constantly acquired during the operation, and the target condensation temperature Tcm is changed in accordance with the change of the required capacity.

The target degree of subcooling SCm at the outlet of the indoor heat exchanger 16 in the indoor unit 3 is predetermined to be suitable for the target condensation temperature Tcm. These values SCm and Tcm are stored, in association with each other, in the storage unit or the like of the control apparatus 30. Therefore, after the control apparatus 30 sets the target condensation temperature Tcm by the target refrigerant temperature setting unit 32 in accordance with the largest required capacity, the control apparatus 30 causes the target refrigerant state setting unit 33 to read, from the storage unit, and set the target degree of subcooling SCm suitable for the target condensation temperature. Then, in each indoor unit 3, the opening degree of the indoor expansion valve 15 is controlled such that the degree of subcooling SC at the outlet of the indoor heat exchanger 16 becomes the target degree of subcooling SCm.

In the case where the target condensation temperature Tcm and the target degree of subcooling SCm are set in accordance with the largest required capacity as described above, these values are applied to all the indoor units 3. Therefore, the indoor unit 3 with a small required capacity may heat air more than necessary, and the worker M in the work area 5 may feel uncomfortable by air blown out at a temperature much higher than the target blow-out temperature Tfm. During the cooling operation, as described above, each indoor unit 3 is configured to perform control for individually changing the target degree of superheating SHm in the indoor unit 3 when the blow-out temperature Tf of the indoor unit 3 satisfies a predetermined relationship with the target blow-out temperature Tfm.

During the heating operation, however, in a case where the target degree of subcooling SCm is changed to increase for a similar purpose to the case of the cooling operation, the liquid refrigerant may be accumulated in a specific indoor heat exchanger 16, and the amount of refrigerant flowing through the entire refrigerant circuit of the air conditioner 1 may be insufficient. In one or more embodiments, therefore, the heating capacity is maintained without changing the target degree of subcooling SCm, even if the blow-out temperature Tf rises significantly above the target blow-out temperature Tfm during the heating operation. This enhances the reliability of the air conditioner 1.

The present invention is not limited to the above-described embodiments and modifications, but can be variously modified within the scope described in the claims.

For example, the spot-type utilization unit in one or more embodiments may be installed outdoors. The air conditioner according to one or more embodiments of the present invention is not limited to one including a spot-type utilization unit, but may alternatively include a utilization unit that adjusts a temperature of an entire space such as the interior of a room.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: AIR CONDITIONER
2: OUTDOOR UNIT (HEAT SOURCE UNIT)
3: INDOOR UNIT (UTILIZATION UNIT)
10: REFRIGERANT CIRCUIT
11: COMPRESSOR
12: FOUR-WAY SWITCHING VALVE (SWITCHING DEVICE)
13: OUTDOOR HEAT EXCHANGER (HEAT SOURCE-SIDE HEAT EXCHANGER)
15: INDOOR EXPANSION VALVE (DECOMPRESSING DEVICE)
16: INDOOR HEAT EXCHANGER (UTILIZATION-SIDE HEAT EXCHANGER)
26: BLOW-OUT TEMPERATURE SENSOR (DETECTION SENSOR)
30: CONTROL APPARATUS
SC: DEGREE OF SUBCOOLING (PREDETERMINED REFRIGERANT STATE)
SCm: TARGET DEGREE OF SUBCOOLING
SH: DEGREE OF SUPERHEATING (PREDETERMINED REFRIGERANT STATE)
SHm: TARGET DEGREE OF SUPERHEATING
Tc: CONDENSATION TEMPERATURE
Tcm: TARGET CONDENSATION TEMPERATURE
Te: EVAPORATION TEMPERATURE
Tem: TARGET EVAPORATION TEMPERATURE
Tf: BLOW-OUT TEMPERATURE (COOLING TEMPERATURE, HEATING TEMPERATURE)

Tfm: TARGET BLOW-OUT TEMPERATURE
ΔTf: DIFFERENTIAL TEMPERATURE (REQUIRED CAPACITY)
Δt: PREDETERMINED VALUE

The invention claimed is:

1. An air conditioner comprising:
a heat source unit including a compressor and a heat source-side heat exchanger; and
a plurality of utilization units each including a decompressing device and a utilization-side heat exchanger, wherein
the utilization units are connected in parallel to the heat source unit to form a refrigerant circuit, and
the air conditioner performs a cooling operation using the heat source-side heat exchanger as a condenser and the utilization-side heat exchanger as an evaporator;
a detection sensor that detects a state of air related to a required capacity of each of the utilization units; and
a control apparatus that:
acquires the required capacity of each of the utilization units based on a detection result of the detection sensor;
sets target values, based on the highest required capacity acquired, of each of:
an evaporation temperature in the utilization-side heat exchanger that is adjusted by the compressor, and
a predetermined refrigerant state that is adjusted by the decompressing device; and
when a cooling temperature becomes lower than a target cooling temperature by a predetermined value or more in one of the utilization units that does not have the highest required capacity, changes the target value of the predetermined refrigerant state such that a cooling capacity of the utilization unit having the highest required capacity is lowered, wherein
the heat source unit further includes a switching device that switches the cooling operation to a heating operation where the heat source-side heat exchanger is used as the evaporator and the utilization-side heat exchanger is used as the condenser, and
during the heating operation, the control apparatus:
acquires the required capacity of each of the utilization units;
sets target values, based on the highest required capacity, of each of:
a condensation temperature in the utilization-side heat exchanger that is adjusted by the compressor, and
the predetermined refrigerant state that is adjusted by the decompressing device; and
even when a heating temperature rises above a target heating temperature in one of the utilization units other than the utilization unit having the highest required capacity, maintains the target value of the predetermined refrigerant state.

2. The air conditioner according to claim 1, wherein
the predetermined refrigerant state is a degree of superheating, and
when the cooling temperature becomes lower than the target cooling temperature by the predetermined value or more in the utilization unit having the highest required capacity, the control apparatus sets a target value of the degree of superheating higher than before the cooling temperature is lowered.

3. The air conditioner according to claim 1, wherein
when the cooling temperature becomes lower than the target cooling temperature by the predetermined value or more in the utilization unit having the highest required capacity, the control apparatus controls the decompressing device such that a refrigerant flow path in the decompressing device becomes narrower than before the cooling temperature is lowered.

4. The air conditioner according to claim 1, wherein
each of the utilization units is a spot type utilization unit that blows temperature-controlled air directly onto a target to be cooled.

* * * * *